United States Patent [19]

Aiba

[11] 4,412,597
[45] Nov. 1, 1983

[54] ENGINE SUPPORT STRUCTURE FOR MOTORCYCLES

[75] Inventor: Yasuaki Aiba, Sakado, Japan

[73] Assignee: Honda Giken Kogyo Kabushiki Kaisha, Tokyo, Japan

[21] Appl. No.: 301,274

[22] Filed: Sep. 11, 1981

[30] Foreign Application Priority Data

Sep. 22, 1980 [JP] Japan .................................. 55-132072
Oct. 24, 1980 [JP] Japan .................................. 55-149037
Oct. 28, 1980 [JP] Japan .................................. 55-150967

[51] Int. Cl.³ ............................................... B60K 5/12
[52] U.S. Cl. .................................... 180/228; 180/291; 248/596; 248/646
[58] Field of Search ............... 180/228, 219, 227, 291; 248/567, 589, 596, 607, 646, 669

[56] References Cited

U.S. PATENT DOCUMENTS 3,542,146 11/1970 Hooper ................................ 180/228
3,616,870 11/1971 Kramer ................................ 180/227
4,324,306 4/1982 Ishihara et al. ................... 180/228

Primary Examiner—Joseph F. Peters, Jr.
Assistant Examiner—Donn McGiehan
Attorney, Agent, or Firm—Posnack, Roberts, Cohen & Spiecens

[57] ABSTRACT

A motorcycle of chain drive type comprising a frame and an engine supported from the frame at a plurality of locations. The engine drives a drive wheel of the motorcycle through a chain. At least at one of the plurality of support locations is a link coupling coupled to the frame and engine for pivotal movement in a vertical plane while being rigid in the widthwise direction of the frame.

25 Claims, 22 Drawing Figures

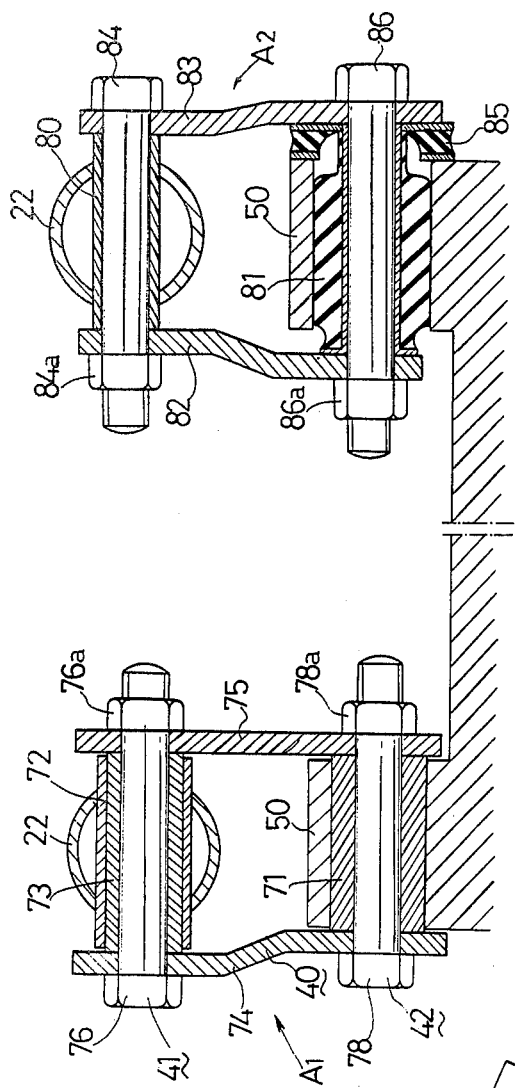
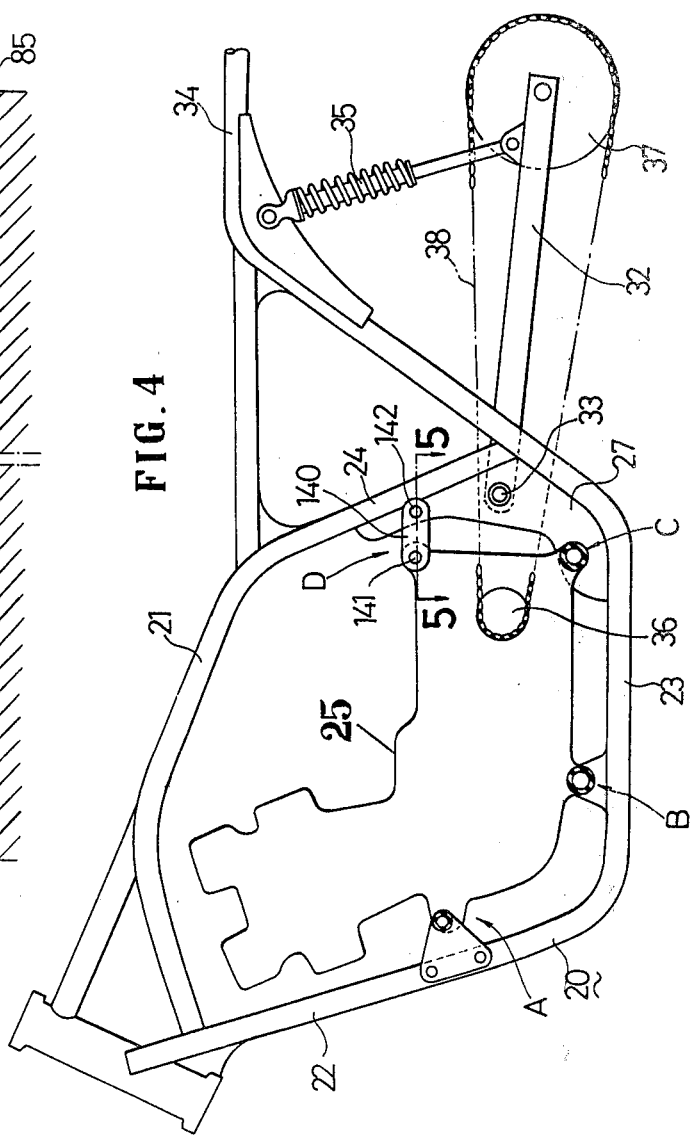
FIG. 3
FIG. 4

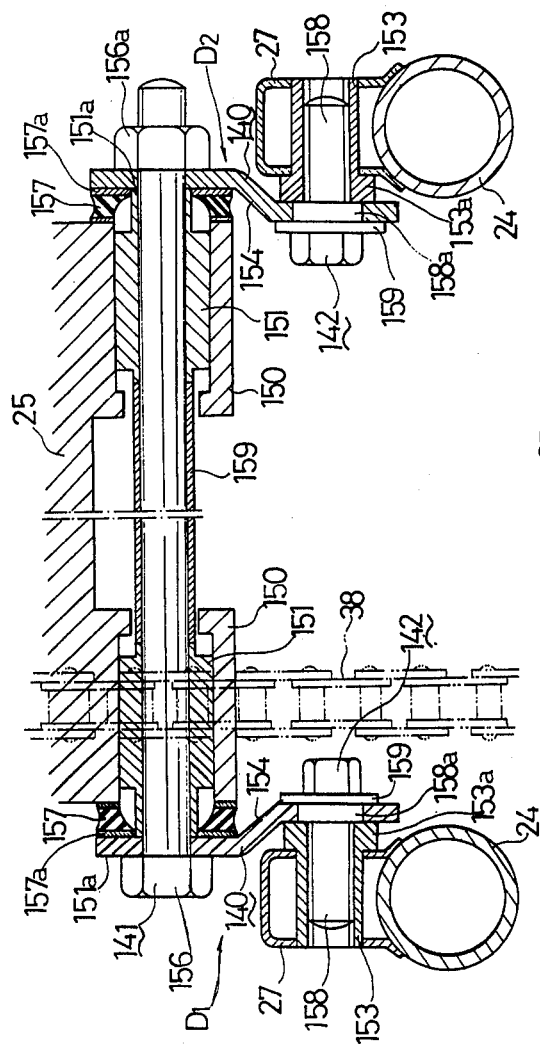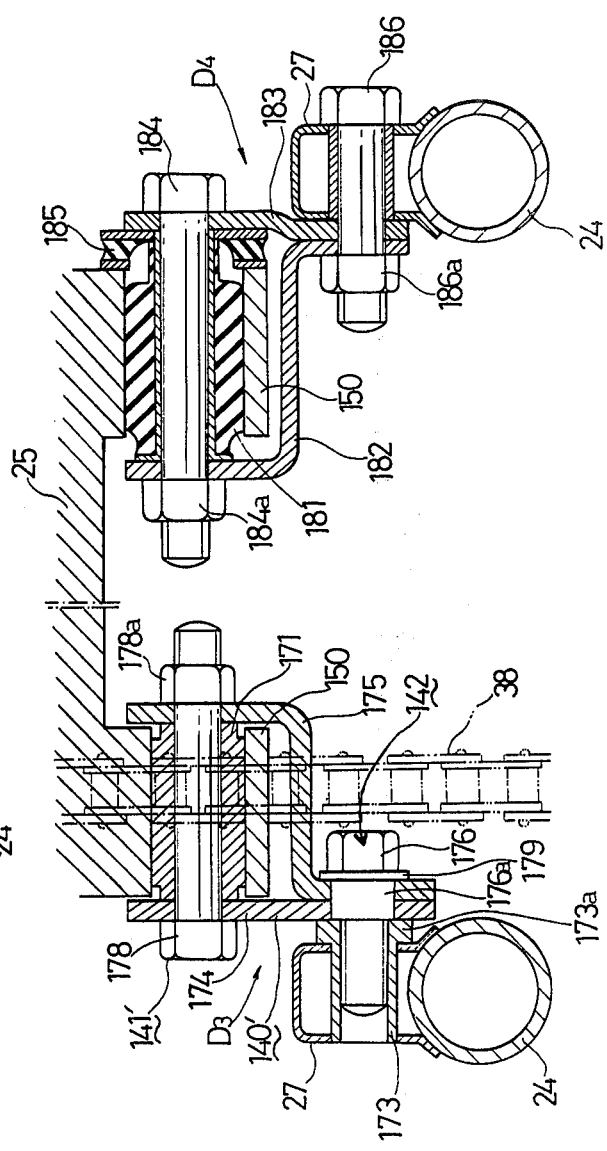
FIG.5
FIG.6

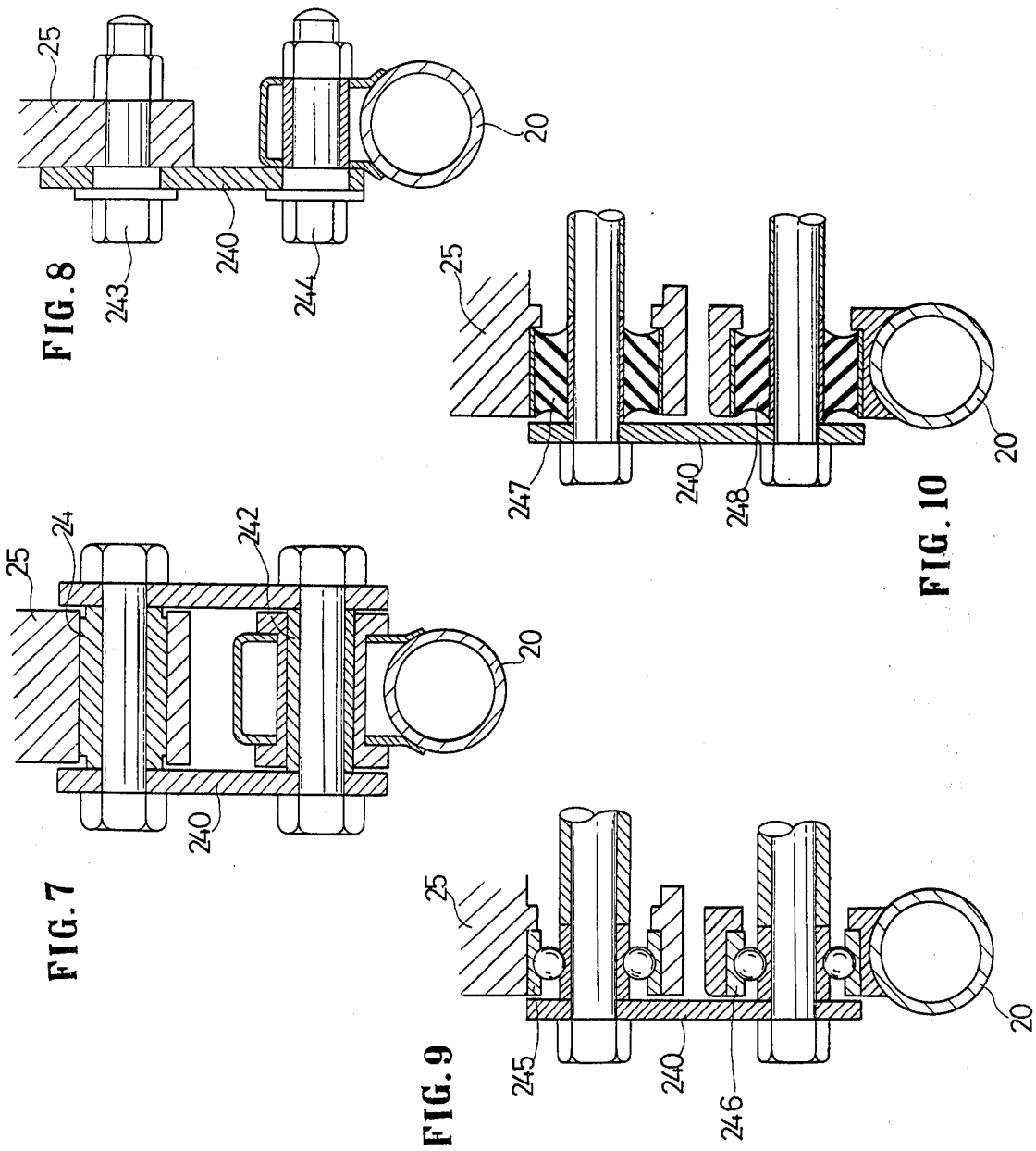

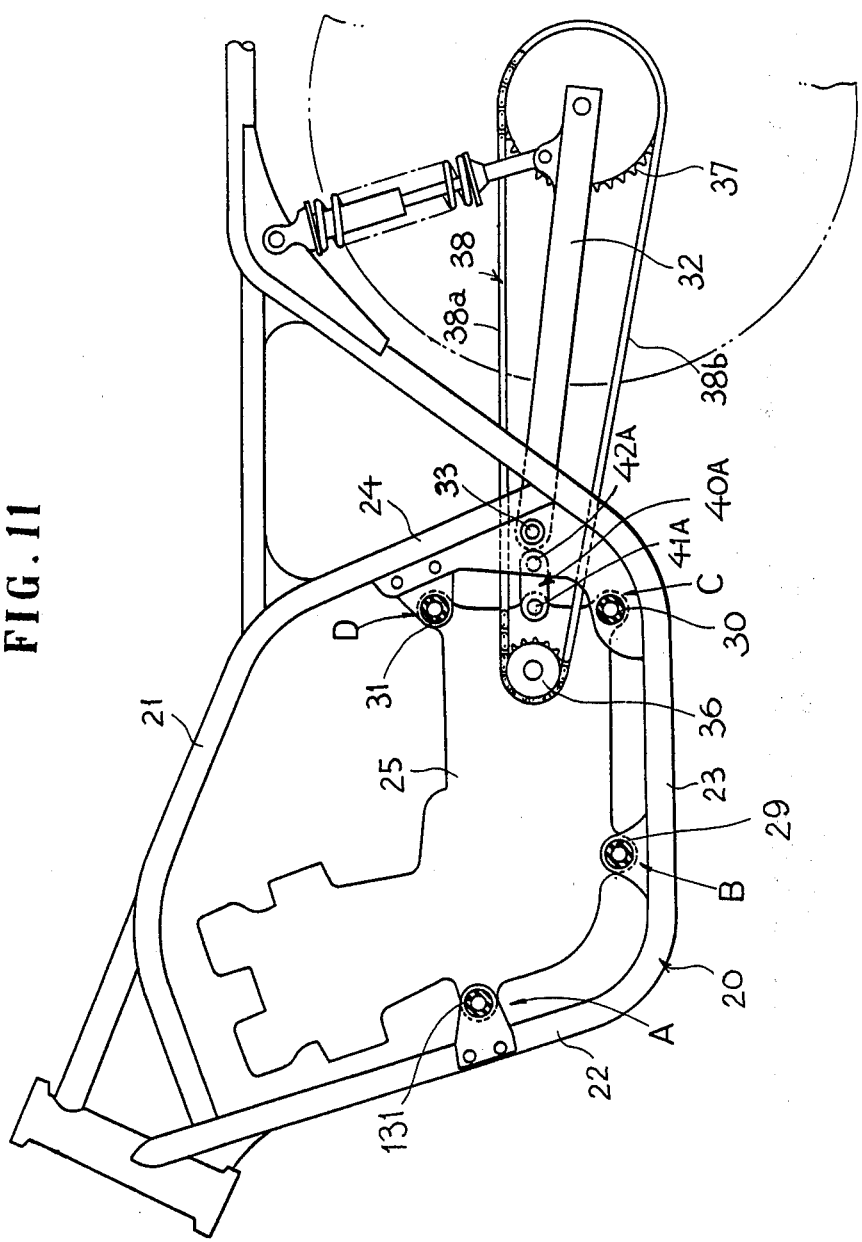

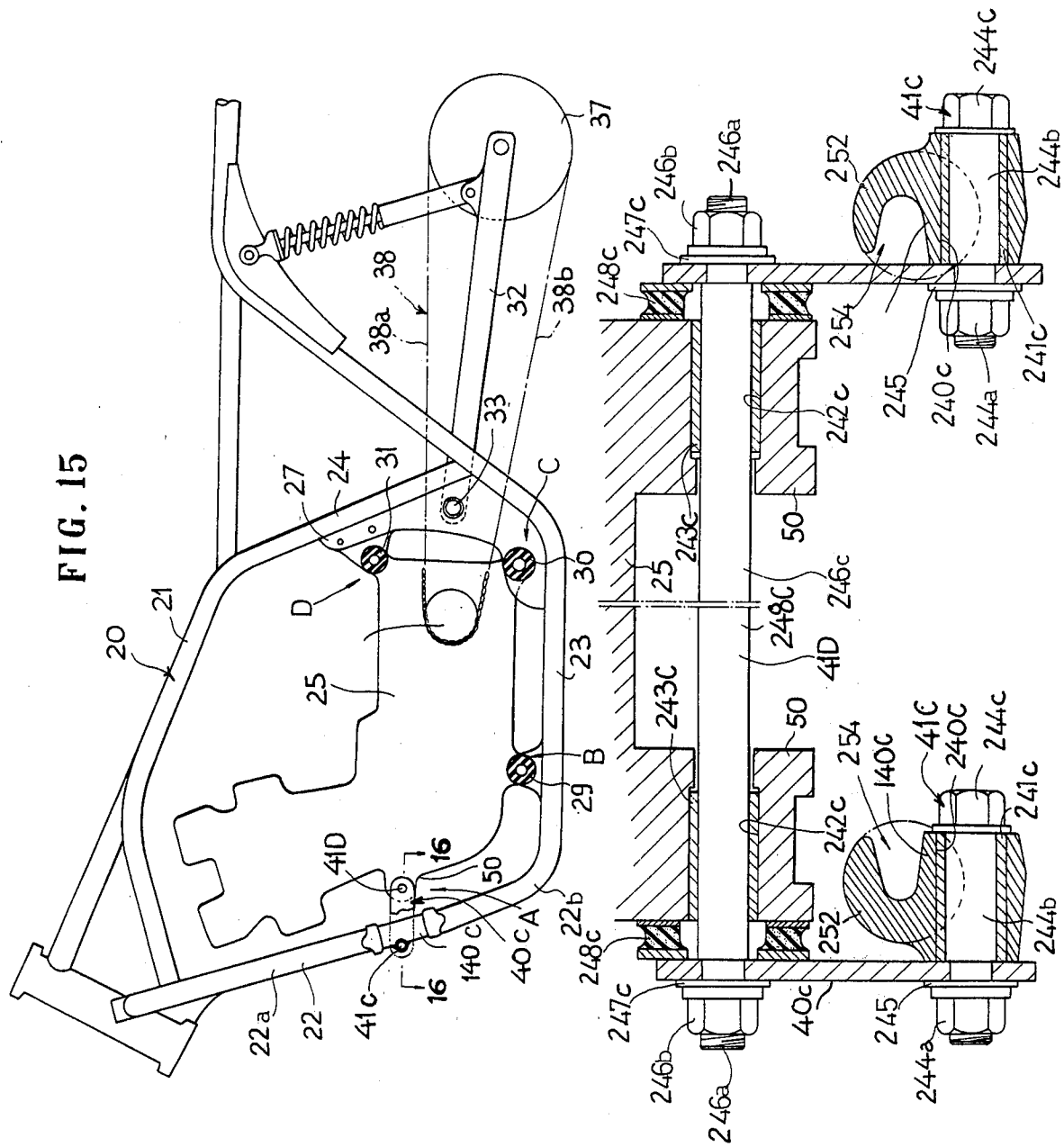

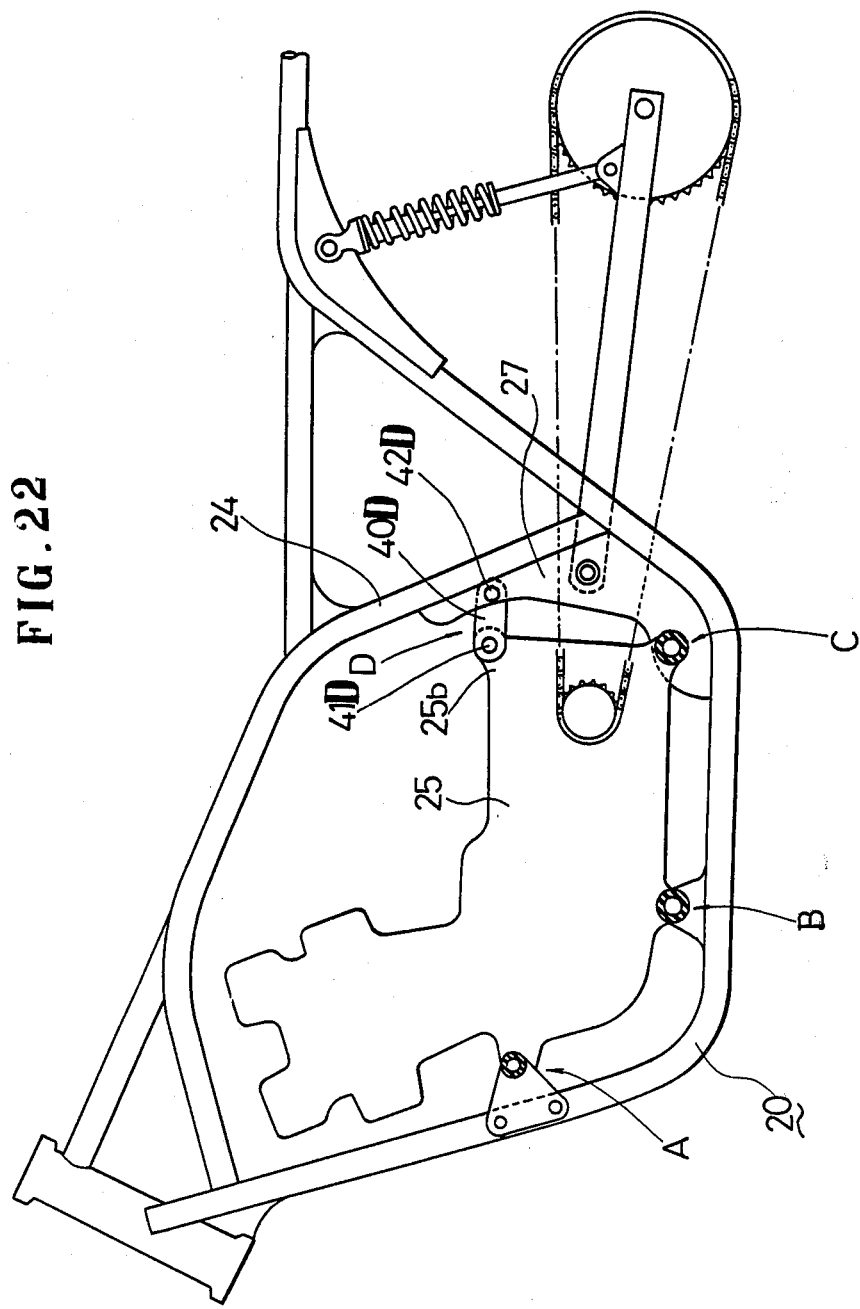

ENGINE SUPPORT STRUCTURE FOR MOTORCYCLES

FIELD OF THE INVENTION

The present invention relates to an engine support structure for a motorcycle of chain drive type, and more particularly to an engine support structure which can resist displacement of the engine by the tensile force exerted upon the chain during acceleration or deceleration.

PRIOR ART

Known in the art is a structure, in which rubber members are sandwiched between the body or frame of a motorcycle and the engine at a plurality of positions to couple and hold the engine with damped vibration transmission from the engine to the frame. Such engine support structure can be relatively easily adopted in the shaft drive type, in which engine power is transmitted through a propeller shaft to the rear wheel, because the wheel base is fixed. It is, however, difficult to adopt this engine support structure for chain drive, in which a chain is used as the power transmission means between the engine and the rear wheel. This is because a tensile force is exerted upon the chain, if the motorcycle is accelerated or decelerated, and the engine is urged rearwardly with respect to the body by the tensile force which deteriorates the properties and shortens the life of the rubber members. This is especially true for a motorcycle of large size with a large displacement engine since both the weight and mass are large. In addition, since the engine drive sprocket which meshes with the chain is not positioned on the longitudinal center line of the engine but is laterally offset, the tensile force also produces a moment to roll or twist the engine in the widthwise directions of the body on its supports.

SUMMARY OF THE INVENTION

An object of the invention is to provide engine support structure for a motorcycle of large size which avoids the disadvantages of the prior art construction.

A further object of the invention is to provide engine support structure for a motorcycle of chain drive type, in which the engine is supported by the body or frame at a plurality of positions.

Yet another object of the invention is to provide engine support structure in which a link coupling is provided at least at one of said support positions which is pivotable in a vertical plane to absorb vertical vibrations of the engine and prevent them from being propagated to the body.

Another object of the invention is to provide a link coupling which resists rearward displacement of the engine under the action of the tensile force in the chain during acceleration or deceleration.

Another object of the invention is to provide rigidity of the link coupling in the widthwise direction of the body to prevent rolling or twisting of the engine about a vertical axis by a moment produced by the tensile force in the chain.

In accordance with the above and further objects, the invention provides an improved coupling means between the frame and engine of a motorcycle of chain drive type wherein said coupling means includes a link coupling coupled to said frame and engine for pivotal movement in a vertical plane and being rigid in the widthwise direction of the frame to resist turning movement of the engine about a vertical axis under the action of a moment produced by tension in the chain during acceleration and deceleration of the motorcycle.

In accordance with a feature of the invention, the link coupling is laterally offset from the longitudinal center plane of the engine at the same side as a drive sprocket for the chain.

In accordance with another feature of the invention, the engine and frame include respective bosses which extend longitudinally towards one another and the link coupling is pivotably connected at opposite ends thereof to the bosses.

In accordance with another feature of the invention, the link coupling is located at a level between the upper and lower lengths of the chain to minimize torsional forces on the engine about a transverse horizontal axis. In a particular embodiment, the link coupling is disposed between the lengths of the chain between the engine and the frame.

In accordance with another feature of the invention, the link coupling includes a pair of vertically spaced link supports each respectively pivotably connected to the rear of the engine and to the frame. The link supports are respectively located above and below the upper and lower lengths of the chain.

In accordance with a further feature of the invention, a link connecting portion is provided in the down tube portion of the frame which is constructed as a forged member. The forged member includes a curved portion which opens rearwardly and extends longitudinally of the down tube portion. A tubular housing portion is integrated with the curved portion and is provided with a hole which extends longitudinally of the frame and approximately perpendicularly to the longitudinal axis of the down tube portion for receiving a hinge pin for connection with one end of the link coupling.

In the engine support structure of the construction and operation thus far described, it is sometimes necessary to minimize the size tolerance of the connection portions where the link coupling, the body frame and the engine are coupled by means of pins to improve the machining precision. If the bearing portions or members for the pins are disposed at the side of the frame or the engine, the machining operations become troublesome and require a number of machining steps because the workpiece, e.g. the engine or frame is of large size. Another difficulty which is encountered is the necessity for a special machining jig. On the other hand, if the engine support structure using the link coupling is intended to be applied to an existing body, it becomes difficult to adopt a desired link coupling structure because the usable space in the widthwise direction of the body between the body frame and the engine is restricted.

Another object of the invention is to provide a link coupling in which bearing members for the pins where the link coupling, frame and engine are hingedly coupled are arranged at both ends of the link coupling so that all the machining operations which are required to minimize machining size tolerances at the coupling can be effected on the link coupling which itself is a relatively small member so that the machining operations can be facilitated.

Another object of the invention is to provide a link coupling in which the load bearing area is enlarged by shaping the link to be inclined in the transverse direction of the body, even if the usable space in the widthwise direction of the body between the frame and the engine is restricted whereby the coupling strength of the link coupling can be increased.

A further object of the invention is to provide a method for supporting an engine of chain drive type from the frame of a motorcycle.

It is a further object of the invention to provide such a method which will adequately resist any tendency of rearward displacement of the engine on its supports under the action of tension in the chain of the drive during acceleration and deceleration of the motorcycle.

Still another object of the invention is to provide a method for support of the engine which will resist any tendency of the engine to be turned on its supports due to a moment produced by the tension in the chain as a consequence of the offset disposition of the drive sprocket of the engine on which the chain is wound.

In accordance with the above objects directed to the method, the invention contemplates a method in which a link is provided at one of the support locations for the engine which is pivotably connected to the engine and frame for movement in a vertical plane while providing transverse rigidity to resist turning movement of the engine about a vertical axis.

The invention will be described in relation to a number of embodiments thereof with reference to the figures of the drawing.

BRIEF DESCRIPTION OF THE SEVERAL VIEWS OF THE DRAWING

FIG. 3 is a sectional view similar to FIG. 2 according to a modification.

FIG. 4 is similar to FIG. 1 but shows another embodiment of the invention.

FIG. 5 is a sectional view along line 5—5 in FIG. 4.

FIG. 6 is similar to FIG. 5 but shows a modified embodiment.

FIG. 7 is a top plan view in section showing modified hinge means for connecting the link coupling to the body and the engine.

FIG. 8 shows another top plan view in section of another embodiment of hinge means.

FIG. 9 shows another top plan view in section of another embodiment of hinge means.

FIG. 10 shows another top plan view in section of another embodiment of hinge means.

FIG. 11 is similar to FIG. 1 but shows another embodiment.

FIG. 15 is similar to FIG. 1 but shows another embodiment of the invention.

FIG. 16 is a sectional view taken on line 16—16 in FIG. 15.

FIG. 22 is similar to FIG. 20 but shows another embodiment of the invention.

DETAILED DESCRIPTION

Figures 1, 2:
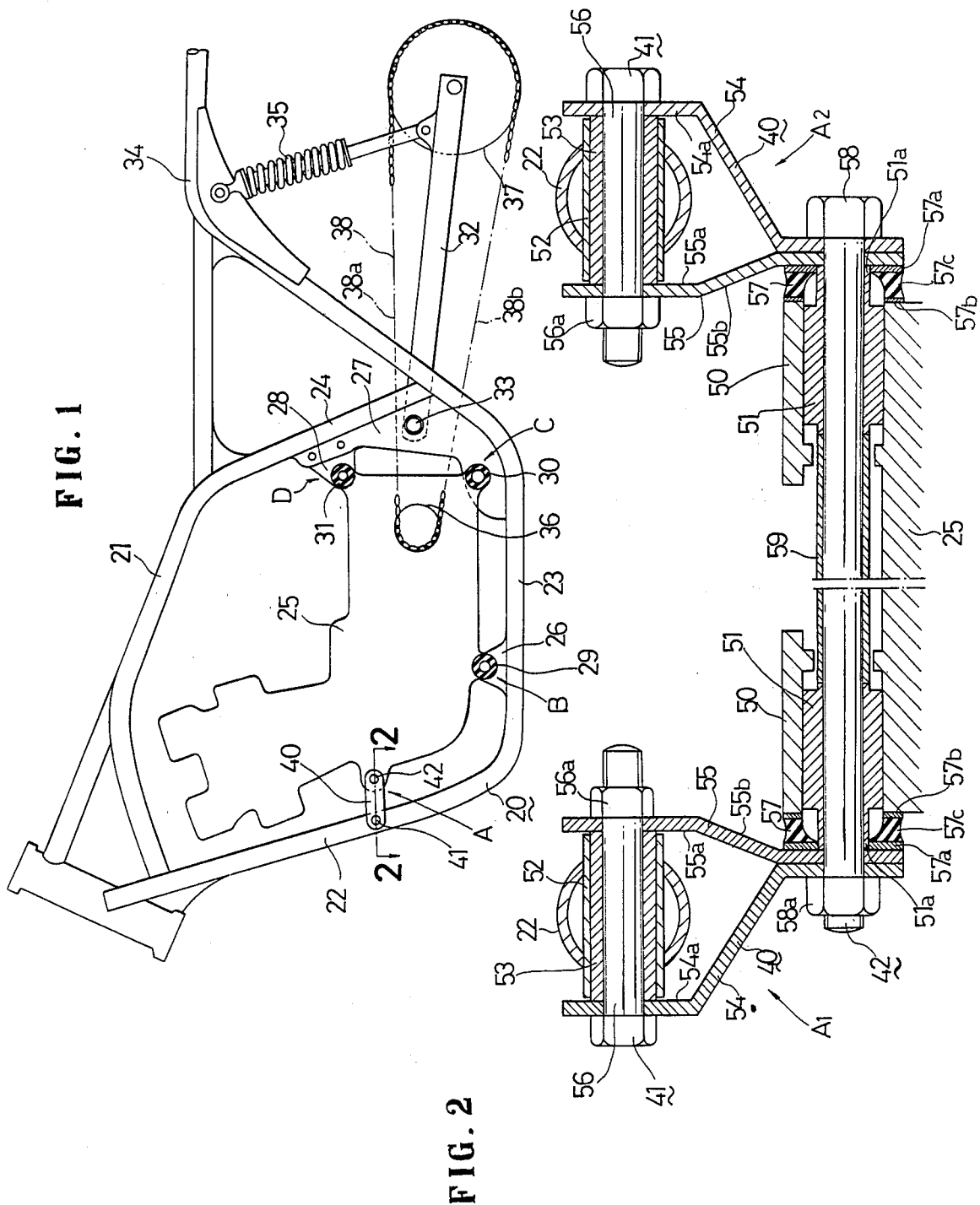
FIG. 1 is a schematic side-elevational view of the frame of a motorcycle with associated equipment.
FIG. 2 is a sectional view taken on line 2—2 in FIG. 1.

Referring to the drawing, therein is seen a body frame 20 of a motorcycle and equipment attached thereto. The body frame 20 comprises a main frame portion 21, a down tube portion 22, a bottom frame portion 23 and a rear frame portion 24. The frame portions 21,23,24 and the down tube portion 22 form a loop as seen in side view, in which an engine 25 is disposed. The engine 25 is coupled to and held on the body frame 20 at a plurality of supports A,B,C and D. The support B is on a bracket 26 fixed to the bottom frame portion 23. The support C is on a bracket 27 which is fixed to the bottom frame portion 23 and the rear frame portion 24. The support D is on an engine hanger bracket 28 which is fixed to the bracket 27. The supports B, C and D include rubber mountings respectively comprising rubber members 29, 30 and 31 sandwiched between the body frame 20 and the engine 25.

A rear fork 32 carries a rear wheel (not shown) at the rear end thereof. The front end of fork 32 is hinged to the bracket 27 by a pivot pin 33 such that the fork 32 can pivot in a vertical plane. A shock absorber 35 is connected between the rear fork 32 and a seat rail frame portion 34, to damp vertical pivotal movement of the rear fork 32. A chain 38 is wound on a drive sprocket 36 of the engine 25 and a driven sprocket 37, which is supported on the rear fork 32 coaxially with the rear wheel, so that engine power is transmitted through the chain 38 to the rear wheel.

A holding structure according to the present invention is provided at support A which is located at a front portion of the engine 25. The holding structure comprises a link 40 having a length in the longitudinal direction of the body which connects the down tube portion 22 and the front portion of the engine 25. The link 40 serves as an engine hanger bracket and its front and rear ends are hinged to horizontal pins 41 and 42 so that they can pivot vertically with respect to the down tube portion 22 and the engine 25.

Looking next at FIG. 2 therein is seen rotatable collars 51 fitted rotatably and loosely in two boss portions 50 protruding at the front face of the engine 25. The down tube portion 22 includes left and right tubes disposed in front of the engine 25, and to which are fixed tubular members 52 extending in the widthwise direction of the body. The tubular members 52 loosely and rotatably receive collars 53. The link 40 further comprises left and right link plates 54 and 55 whose front portions are engaged with the collars 53 at opposite ends thereof. The pin 41 comprises a bolt 56 extending through the link plates 54 and 55 and through the collars 53. A nut 56a is engaged on each bolt. The collar 53 is slightly longer than the tubular member 52 so that the inner faces 54a and 55a of the link plates 54 and 55 are forced into contact with both of the end faces of the collar 53 upon engagement of the nut 56a so that the link plates 54 and 55 can be vertically pivoted with the bolt 56, while maintaining the contact engagement with the link plates. In this regard the outer circumference of the collar 53 slides while remaining in face-to-face contact with the inner circumference of the tubular member 52.

A rubber thrust member 57 is mounted between each of the outer end faces of the left and right boss portions 50 of the engine 25, and the rear portions of the two link plates 54 and 55. Each thrust member 57 comprises a rubber element 57c fixed between inner and outer washers 57a and 57b. The rear portions of the link plates 54,55 are in contact with one another and are engaged with the outer washer 57a of the thrust member 57. The pin 42 comprises a long bolt 58 extending in the engaged rear portions of the two left and right link plates 54 and 55 and in the two left and right rotatable collars 51. A spacer collar 59 is interposed during the inserting operation between the collars 51 and a nut 58a is engaged on the bolt 58. Since the distance between the collars 51 is determined by the spacer collar 59 and since each of the collars 51 is formed at its outer end portion with a reduced portion 51a which extends through the outer washer 57a of the thrust member 57, the outer face 55b of the link plate 55 is forced to contact the edge of the reduced collar portion 51a upon tight engagement of the nut 58a. The outer circumference of the rotatable collar 51 travels in face-to-face contact with the inner circumference of the boss portion 50, while the forced contact of the link plates 55 and the collars 51 are maintained such that the rear portions of the link plates 54 and 55, i.e., the rear portion of the link 40 can pivot vertically on the bolt 58.

Since the rotatable collars 51 and 53 are respectively provided in integrated states at the front and rear locations of the link 40 and since the rotatable collars 51 and 53 are respectively in metal-to-metal contact with the boss portions 50 of the engine 25 and with the tubular members 52 of the frame 20, link 40 has high rigidity in the widthwise direction of the body in addition to its strength as afforded by the construction of link 40 from the two left and right link plates 54 and 55. Moreover, the links 40 have identical construction at the two left and right positions $A_1$ and $A_2$ at the support A.

During acceleration at the start of travel of a motorcycle, a driving force for rotating the rear wheel is generated at the upper chain portion 38a of the chain 38 so that a rearward tensile force is applied as a reaction to the upper chain portion 38a. During deceleration when the motorcycle is braked by the engine, on the other hand, a rearward tensile force is applied to the lower chain portion 38b as the rear wheel is rotationally decelerated. In either case, the engine 25 is urged rearwardly of the body. This rearward force is applied as a tensile load to the link 40 which resists rearward displacement of the engine 25. Vertical vibrations of the engine during the driving operation of the engine are absorbed by vertical pivotal motions of the link 40 on the horizontal pins 41 and 42 so that engine vibrations are prevented from being transmitted through the support A to the body frame 20. In the embodiment shown in FIG. 1, the drive sprocket 36 of the engine 25 is offset to the left from the vertical plane extending longitudinally along the widthwise center axis of the engine 25 so that the aforementioned tensile force of the chain 38 produces a torque proportional to said offset which tends to twist engine 25 to the left of the widthwise direction of the body. This twisting of the engine is restrained by the link 40 which has a strengthened transverse rigidity, as has been previously described. The rubber thrust members 57 serve to block the transmission of the transversely vibrating components of the engine 25 to the link 40 and to couple the link 40 and the engine with a suitable flexibility so that they absorb the propagations from the engine 25 to the link 40 in case the engine 25 more or less vibrates in the transverse direction against the rigidity of the link 40. Since, at this time, the rubber thrust members 57 are used as compression rubber members, they will have high durability.

FIG. 3 shows a modified construction in which a rotatable link coupling 40' similar to that in FIG. 2 and having transverse rigidity is utilized at the left support $A_1$ of the two left and right supports $A_1$ and $A_2$ of the support A. The support $A_1$ is laterally offset to the same side to which the drive sprocket 36 of the engine 25 is offset. The link coupling 40' comprises left and right link plates 74 and 75. Rotatable collars 71 and 73 are loosely fitted in a tubular member 72 of the down tube portion 22 at the left and in the boss portion 50 of the engine, respectively. The front and rear inner faces of the link plates 74 and 75 are applied against both the end faces of the rotatable collars 71 and 73, and bolts 76 and 78 are inserted in the link plates 74 and 75 and into the collars 71 and 73 so that the link plates 74 and 75 and the collars 71 and 73 are secured by nuts 76a and 78a. Thus, the collars 71 and 73 slidably rotate in face-to-face contact in the boss portion 50 and in the tubular portion 72, respectively.

At the support $A_2$ at the right, on the contrary, the down tube portion 22 at the right and the engine boss portion 50 are coupled by means of an engine hanger bracket coupling structure as known in the art. More specifically, a tubular member 80 is fixedly inserted in the down tube 22, and a rubber member 81 is fitted in the boss portion 50. The front portions of the left and right brackets 82 and 83 are applied against the tubular member 80 and are secured by a bolt 84 and a nut 84a. A rubber thrust member 85 is mounted on bolt 86 and bears against the boss portion 50 and bracket 83 by tightly engaging nut 86a on bolt 86.

By disposing the link coupling in front of the engine 25, as in the embodiments thus far described with reference to FIGS. 2 and 3, the link coupling can be positioned at a distance from the drive sprocket 36 which is disposed at the back of the engine so that the moment load resulting from the tensile force in the chain 38 is accordingly reduced and exerted upon the link coupling, thus offering an advantage in the loading on the link coupling.

In the embodiment shown in FIG. 4, rubber mountings are used in the coupling supports A, B and C, and the link coupling is used at the coupling support D at the back of the engine 25. A link 140, which is elongated in the longitudinal direction of the body, is hinged to the rear portion of the engine and to the bracket 27 of the body frame 20 by means of horizontal pins 141 and 142 such that its front and rear end portions can pivot in a vertical plane.

FIG. 5 is a sectional top plan view of the link coupling at support D in FIG. 4. The link coupling includes two identical left and right portions $D_1$ and $D_2$. Rotatable collars 151 are loosely fitted in boss portions 150 which are provided at the left and right sides at the rear face of the engine and nut members 153 are fixed to left and right brackets 27 of left and right rear frame portions 24 which are disposed at the back of the engine. A reduced portion 151a of the rotatable collar 151 is fitted in an outer washer 157a of a rubber thrust member 157 which is applied against the boss portion 150 and against link plate 154. The pin 141 comprises a long bolt 156 which is inserted into the left and right link plates 154 and collars 151. Upon this insertion, a spacer collar 159 is interposed between the collars 151, and a nut 156a is engaged on the bolt 156. As in the embodiment of FIG. 2, the reduced collar portion 151a and the link plate 154 are forced into contact by tight engagement of nut 156a on bolt 156 so that the link plate 154 and the collar 151 are secured together.

The horizontal pin 142 comprises a stepped bolt 158 having a step portion 158a loosely fitted in the rear portion of the link plate 154, and the bolt 158 is fastened to the nut member 153 which is fixed to the bracket 27. The bolt 158 is secured with its step portion 158a abutting at its end face against the end portion 153a of the nut member 153, whereupon the rear portion of the link plate 154 is made rotatable on the bolt 158 while being in face-to-face contact with a washer 160 and the end portion 153a.

By the metal-to-metal contact between the outer circumference of the rotatable collar 151 and the inner circumference of the boss portion 150 and of the rear portion of the link plate between the washer 160, which is fitted on the stepped bolt 158, and the end portion 153a of the nut member 153, the transverse rigidity of the link plate 154 in the widthwise direction of the body is strengthened.

Rearward tensile force applied to the chain 38 during acceleration or deceleration of the motorcyle acts as a compression load upon the link plate 154 and the link plate 154 opposes displacement of the engine 25 rearwardly whereby displacement of the engine is reduced even if the link plate 154 undergoes pivotal movement.

In the embodiment shown in FIG. 6, the link coupling according to the invention is used at the left side of the two left and right positions $D_3$ and $D_4$ of the coupling D, i.e., at the coupling position $D_3$ at the side, at which the drive sprocket 36 of the engine 25 and the chain 38 are offset and the engine hanger bracket coupling structure as known in the art is used at the right coupling position $D_4$.

The link 140' comprises two left and right link plates 174 and 175, which have their front inner faces forced, by fastening a nut 178a upon a bolt 178, to contact a rotatable collar 171 fitted rotatably and loosely in the left boss portion 150 of the engine, and whose front portions are vertically pivotable by slidable contact of the collar 171 in the boss portion 150 on the bolt 178 which forms part of the horizontal pin 141'. The link plates 174 and 175 are in contact with one another at their rear portions and a step portion 176a of a stepped bolt 176 is loosely fitted in link plates 174 and 175. The bolt 176 is part of pin 142 and is fastened to the nut member 173 of the bracket 27 which is disposed at the left rear frame portion 24. The abutting end portions of the link plates 174 and 175 are pivotable on the stepped bolt 176 while being in face-to-face contact with the end portion 173a of the nut member 173 and with a washer 179.

At the right coupling position $D_4$, the abutting rear portions of two left and right bracket plates 182 and 183 are integrally fastened to the bracket 27 of the right rear frame portion 24 by means of a bolt 186 and a nut 186a, whereas the front portions of the bracket plates 182 and 183 are fastened to both the ends of a rubber member 181, which is fitted in the right boss portion 150 of the engine 25, and further to a thrust rubber member 185, which is applied against the side face of the boss portion 150, by means of a bolt 184 and a nut 184a.

If the coupling is located at the rear portion of the engine as in the embodiments thus described with reference to FIGS. 5 and 6, the link coupling 140' can be mounted at the rear frame portion 24 and have high strength and rigidity, thus offering an advantage in the strength.

FIGS. 7 to 10 show a variety of means for hingeably connecting a link 240 to the body frame 20 and the engine 25. More specifically, FIG. 7 shows a hinging means using rotatable collars 241 and 242 similar to the embodiments of FIGS. 2 and 3. FIG. 8 shows a hinging means using stepped bolts 243 and 244 similar to the embodiments of FIGS. 5 and 6. FIG. 9 shows a hinging means using bearings 245 and 246. FIG. 10 shows a hinging means using rubber bushings 247 and 248. The hinging means using the rotatable collars and the stepped bolts effectively achieves the suspension of the load because they provide metal-to-metal contact. The hinging means using the bearings minimizes the rotational friction thereby enchancing the vibration-preventing effect of the link. The hinging means using the rubber bushings reduces the torsion and spring rate of the link thereby enchancing the vibration-preventing effect, and the vibrations in the longitudinal direction of the link can be absorbed, too, because the bushings are made of rubber.

As has been described hereinbefore, according to the present invention, since the link coupling connecting the frame and the engine is made vertically pivotable, the vertical vibrations of the engine can be absorbed by the swinging motions of the link so that they can be prevented from being propagated to the frame, and a stress is established in the link coupling in opposition to the tensile force, which is exerted upon the chain during acceleration or deceleration of the motorcycle, so that the engine can be blocked from moving in the direction of the tensile force, whereby the rubber mounting structure can be adopted in the chain drive type which heretofore has not been adopted in large-sized motorcycles having a large displacement according to the prior art. Moreover, since the link coupling is constructed to have rigidity in the widthwise direction of the body, the engine can be prevented from being rolled by the moment resulting from the tensile force of the chain.

Referring to FIG. 11, therein is seen an embodiment employing a number of elements of the same construction as in FIG. 1 and these have been given the same reference numerals and will not be discussed in detail further. In FIG. 11, instead of the link coupling 40 at support A, the support A comprises a rubber mounting 131, in a manner identical to the rubber mountings 29,30 and 31 at supports B, C, and D. However, a link coupling 40A is hinged at its front portion to the rear portion of the engine 25, preferably, to that rear portion of the engine 25, which is located at the same level as the drive sprocket 36, by means of horizontal pin 41A such that it can pivot vertically, and is also hinged, at its rear portion to the body frame 20 by means of horizontal pin 42A such that it can pivot vertically. Thus, the engine and the body frame are coupled by the link coupling 40A which is elongated in the longitudinal direction of the body and arranged at the back of the drive sprocket 36.

During acceleration or deceleration when the motorcycle is started or halted, a tensile force is established at the upper or lower portion 38a or 38b of the chain 38 thereby to urge the engine 25 rearwards. Since the engine 25 is rigidly coupled to the body frame 20 in the longitudinal direction of the body by means of the link 40A, the rearward movement of the engine 25 is opposed. Engine vibrations in the vertical directions of the body are absorbed by the vertical swinging motions of the link coupling 40A and are prevented from being propagated through the link coupling 40A to the frame 20 so that the engine vibration attenuating actions by the rubber members 29, 30, 31 and 131 are exhibited notwithstanding the presence of link coupling 40A between the engine 25 and the body frame 20. The location of the link coupling 40A directly behind drive sprocket 36 and between portions 38a and 38b of chain 38 has the effect of minimizing bending moments in the engine since there is a direct line of action from the drive sprocket to the line coupling 40A.

Figure 12:
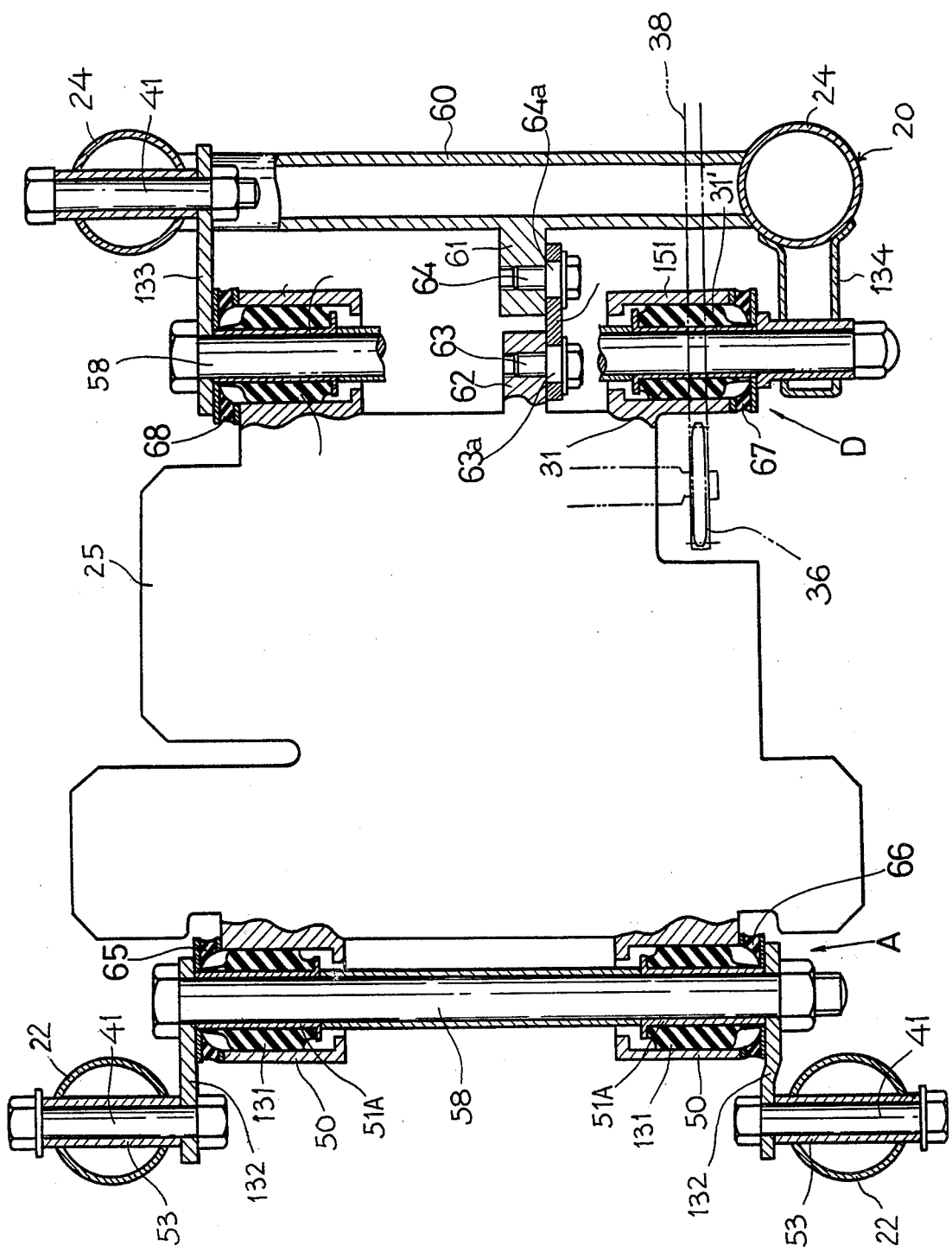
FIG. 12 is a top plan view of the embodiment in FIG. 11 partially broken away in section.

FIG. 12 is a sectional top plan view of the construction in FIG. 11 and shows both the supports A and D and the link coupling 30A. The engine 25 has its front portion integrally formed with left and right hollow boss portions 50, in which are fitted tubular members 51A having the rubber members 131 baked on the outer circumferences thereof. A bolt 41 is inserted into each of the left and right tubes of downtube portion 22. The coupling A further comprises engine hanger plates 132 connected at their front ends to bolts 41 and thereby to downtube portion 22 of frame 20. The rear portion of plates 132 are fastened to the engine 25 by means of long bolt 58 which is inserted into the left and right tubular members 51A. The rear portion of the engine 16 is formed with a pair of left and right hollow boss portions 151, in which are fitted tubular member 31' having rubber members 31 fixed to the outer circumferences thereof. At the right and left tubes of rear frame portion 14 are fixed the rear portions of engine hanger plates 133, 134. The hanger plate 133 is fixed to the corresponding tube by bolt 41 and the hanger plate 134 is fixed to the corresponding tube by welding. The front portions of the hanger plates 133 and 134 are connected to the engine 25 by means of a long bolt 58' inserted into the tubular members 31'.

Between the left and right tubes of rear frame 14 transversely extends a cross member 60 which is integrally formed with a boss portion 61 which extends forwardly of the body. The engine 25 is provided with an integrally formed boss portion 62 which extends rearwardly of the body into facing relation with boss portion 61 of the body frame 10. The link coupling 40A is hingedly connected at its opposite ends to the boss portions 61 and 62 by means of stepped bolts 63 and 64 corresponding to the horizontal pins 41A and 42A respectively. The vertical pivotal motions of the link 40A are effected between the outer circumferences of step portions 63a and 64a of the bolts 63 and 64. The drive sprocket 36 of the engine 25 is offset either from the widthwise center line of either the engine 25 or the body 20 so that the tensile force of the chain 38 produces a rolling moment on the engine 25 through the spocket 36, as has been described hereinbefore. However, since the link coupling 40A between the engine and the body frame has high transverse rigidity by connection with the boss protions 61 and 62, the engine 25 is prevented from being twisted.

Rubber thrust members 65,66,67 and 68 are interposed between the front and rear boss portions 50 and 151 of the engine 25 and the engine hanger plates 132 and 133 to prevent transmission of transverse vibrating components of the engine 25 through the plates 132 and 133 to the body frame 20 even if the engine 25 is more or less twisted against the transverse rigidity of the link coupling 40A.

Figure 13:
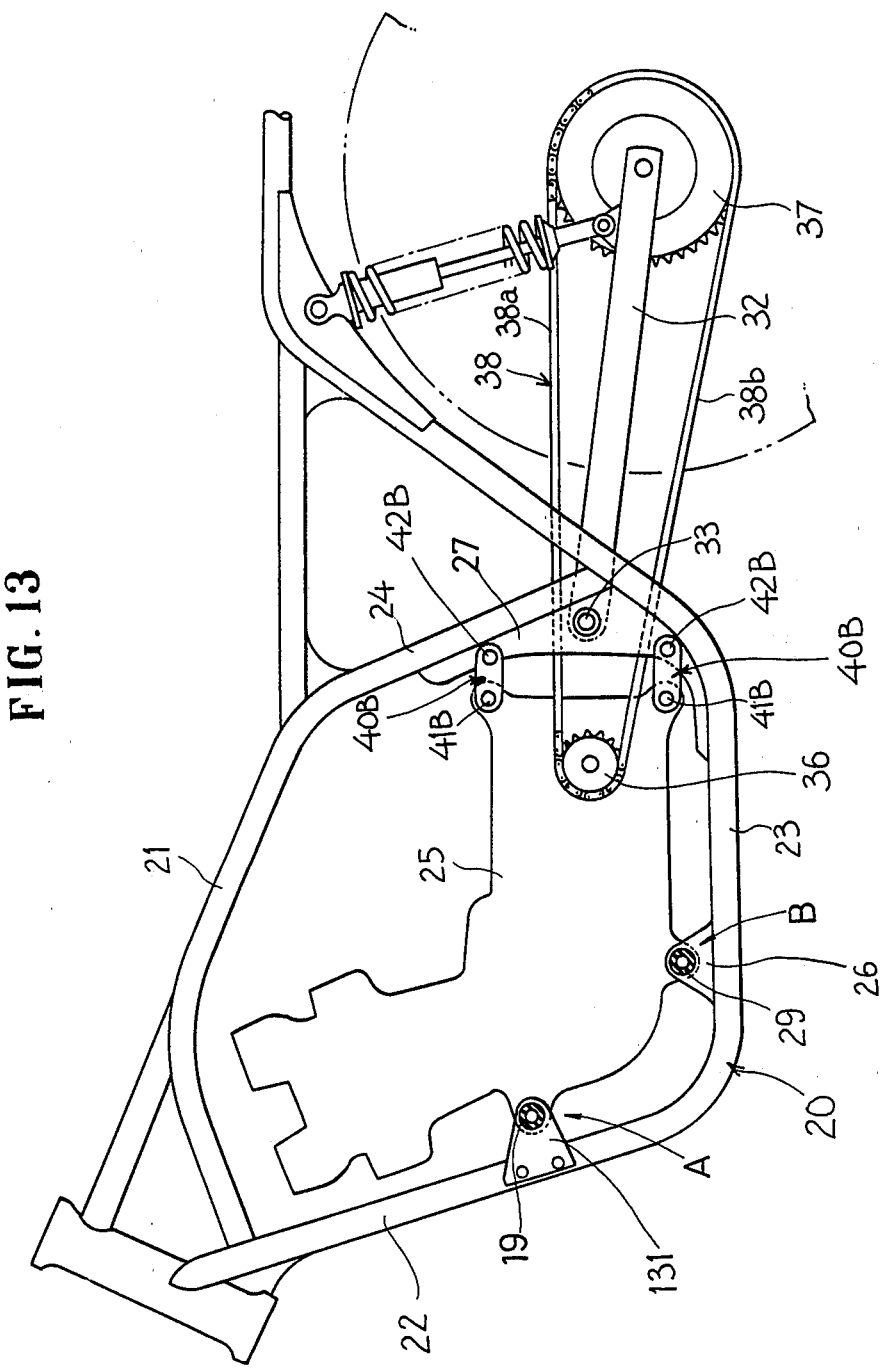
FIG. 13 is similar to FIG. 11 but shows another embodiment.

FIG. 13 is similar to FIG. 11 and the same reference numerals have been used for the same elements. In FIG. 13 supports A and B are of the same construction as in FIG. 11. However, instead of supports C and D and link coupling 40A in FIG. 11, the embodiment of FIG. 13 employs upper and lower link couplings 40B at the rear of engine 25. The link couplings 40B are respectively located above and below chain 38. Each of the link couplings 40B is hinged at its front portion to the engine 25 by means of a horizontal pin 41B and at its rear portion to the bracket 27 by means of a horizontal pin 42B such that the link couplings 40B can pivot in a vertical plane so that the rear portion of the engine and the body frame 20 are coupled by means of a parallel link mechanism constituted by upper and lower link couplings 40B.

During the acceleration or deceleration when the motorcycle is started or halted, the rearwardly directed tensile force at the upper portion 38a or the lower portion 38b of the chain 38 tends to move the engine 25 rearwardly. Since the engine 25 is coupled to and held on the body frame 20 rigidly in the longitudinal direction of the body by means of the parallel link mechanism, movement of the engine 25 is blocked. Vertical engine vibrations are absorbed and attenuated at the coupling supports A and B by the actions of the rubber mountings thereat and the parallel link mechanism can vertically pivot on the parallel pins 42B at the body frame 20 so that the parallel link mechanism is deformed to absorb the engine vibrations and to prevent the same from being propagated to the body frame 20. Since the drive sprocket 36 of the engine 25 is laterally offset from the widthwise center line of either the engine or the body, the tensile force in the chain 38 produces a moment tending to roll or twist the engine 25. Since the engine 25 is coupled to the body frame 20 to provide high transverse rigidity by the upper and lower link couplings 40B, rolling of the engine 25 is also prevented.

The upper and lower link couplings 40B may be disposed at the left and right sides of the engine 25, or one may be disposed at one side while at the other side may be disposed a rubber mounting of the construction at support A or B or as shown in FIG. 6 at the right side. If the link coupling is disposed only at one side, said link coupling is arranged at the side where the drive sprocket 36 is offset.

Figure 14:
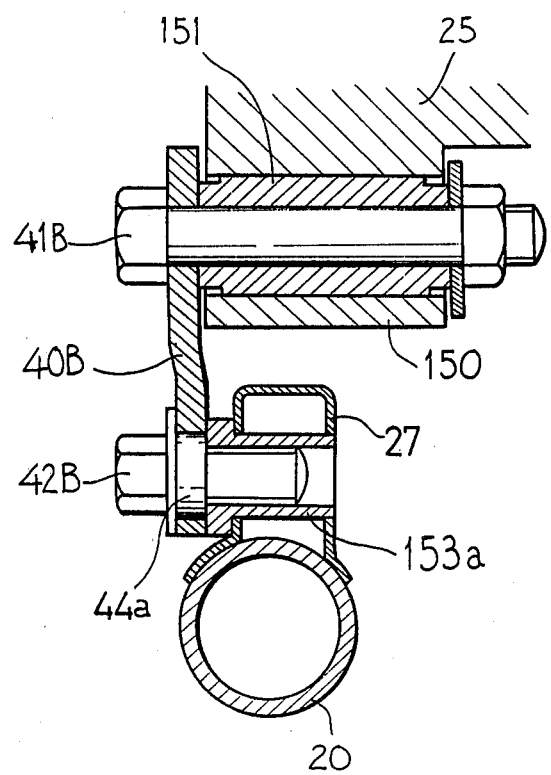
FIG. 14 is a top plan view of a portion of FIG. 13 partially in section.

FIG. 14 shows only the link coupling 40B at the left side of engine 25 and the coupling at the right side can be identical or as described hereinabove. The engine 25 is integrally formed at its rear portion with a hollow boss portion 150, in which a collar 151 is fitted. A nut member 153a is fixedly embedded in bracket 27 secured to the body frame 20. The front portion of the link coupling 40B is fixedly fastened to the collar 151 by means of bolt 41B which is inserted into the internal bore of the collar 151. Bolt 42B is threaded into nut 153a and includes a step portion 44a inserted in a bore in the rear portion of the link coupling 40B. Pivotal movement of link coupling 40B in a vertical plane is effected by rotation of the collar 51 while in face-to-face contact with the inner circumference of the boss portion 150 at the front portion of the link coupling and vertical pivotal movement at the rear portion of the link coupling 40B is effected by sliding movements of the step portion 44a of the stepped bolt 42B. Both hinge connections thereby achieve pivotal movement with metal-to-metal contact.

As apparent from the description, since the engine is coupled to and held on the body frame by means of the parallel link mechanism constructed of the upper and lower link couplings which are elongated in the longitudinal direction of the body, the engine can be blocked by the rigidity of the link mechanism in the longitudinal direction of the body from being moved rearwardly by the tensile force in the chain during the acceleration or deceleration, while the engine vibrations are damped from the frame by deformation of the link mechanism so that the engine can be effectively held on the motorcycle and wherein the engine is rubber-mounted and the chain drive is adopted. Moreover, since the link couplings connecting the engine and the frame are disposed in a plurality of vertical positions, there is enhanced transverse rigidity and rolling of the engine by the moment of the tensile force on the chain can be resisted so that the load acting on the engine can be effectively resisted.

FIG. 15 is similar to FIG. 1 and the same reference numerals have been used for the same elements. In FIG. 15 supports B. C and D are of the same construction as in FIG. 1. However, the support at A is composed of a modified link coupling 40C. The link coupling 40C has its front end connected to the down tube portion 22 of the body frame 10 by means of a connecting member 140C and its rear end connected to the boss portion 50 at the front side of the engine 25. The link coupling 40C is hinged at both its end by means of horizontal pivot pins 41C and 42C respectively to the connecting member 140C and the boss portion 50 is incorporated into the down tube portion 22.

The hinging structure of the link coupling 40C will now be described. This link hinging structure is disposed at each of both the widthwise sides of the engine 25 and has the same symmetrical construction and therefore will be described in conjunction with one side. As shown in FIG. 16, a bushing 241C is fixedly press-fit in a hole 240C of the connecting member 140C, and a bush 243C is fixedly press-fit in a hole 242C of the engine boss portion 50. The pivot pin 41C comprises a stepped bolt 244C inserted in the bushing 241C, and a nut 244A is secured on the bolt 244C at the front end of the link coupling 40C. The link coupling 40C is fixedly clamped between the end face of the step portion 244B of the bolt 244C and a washer 245C so that it can pivot vertically on the bolt 244C since the step portion 244B is rotatably and loosely fitted in the bushing 241C. The pin 41D comprises a stepped bolt 246C formed with threaded portions 246A at both its ends inserted into the bushing 243C. The bolt 246C is inserted into the two boss portions 50 at the left and right sides at the front of the engine 25. When the axial ends of the bolt 246C are inserted into the rear ends of the link couplings 40C and when nuts 246B are fastened, the link coupling 40C is fixedly clamped between the shoulders of the bolt 246C and a washer 247C so that the link coupling 40C can vertically pivot on the bolt 246C since the bolt 246C is rotatably and loosely fitted in the bushing 243C. When the link coupling 40C is attached by means of the bolt 246C, there is sandwiched between the side face of the boss portion 50 and the inner face of the link coupling 40C a rubber thrust member 248C, which has the function of damping the transmission of transverse vibrating components of the engine through the link coupling 40C to the body frame 20 whereby the connection between the link coupling 40C and the engine 25 is elastic to some extent.

Figure 17:
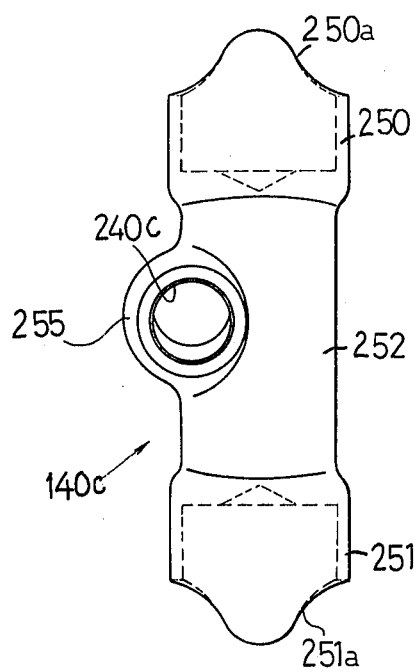
FIG. 17 is a side elevational view of a link connecting portion of the frame in FIG. 15.
Figure 18:
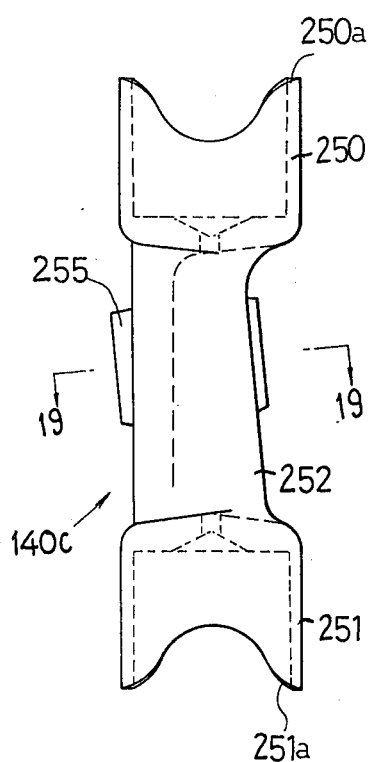
FIG. 18 is a front elevational view of the link connecting portion in FIG. 17.
Figure 19:
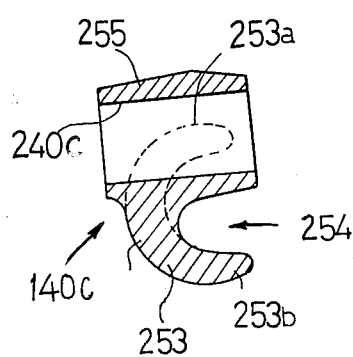
FIG. 19 is a sectional view taken on line 19—19 in FIG. 18.

The connecting member 140C is a forging of the shape as shown in FIGS. 17, 18 and 19 and has high strength and rigidity. The connecting member 104C is formed at its upper and lower end portions with tubular portions 250 and 251 which open respectively upwardly and downwardly. The down tube portion 22 of body frame 20 is divided, as shown in FIG. 15, into upper and lower tube portions 22a and 22b. The upper and lower portions 22a and 22b are joined through the connecting member 140C by fitting and welding cut end portions of the upper and lower tube portions 22a and 22b in and to the tubular portions 250 and 251. Thus, the connecting member 140C is incorporated into the down tube portion 22. Peripheral ends 250a and 251a of tubular portions 250 and 251 are of undulating shape to increase the area to be welded.

The main portion 252 of the connecting member 140C has a transverse sectional shape in which more than half the periphery is arcuately curved and the remainder is removed to form a notched portion 254 as shown in FIG. 19. One end portion 253a of arcuately curved portion 253 is formed with a bulging base portion 255 which is formed with the hole 240C for receiving the bushing 241C. The hole 240C extends laterally in the widthwise direction of the body, as seen in FIG. 16, when the down tube portion 22 and the connecting member 140c are connected. The other end portion 253b of the arcuately curved portion 253 extending from the base portion 255 protrudes in the longitudinal direction of the body while bulging in the widthwise direction of the body. In other words, the main portion 252 of the connecting member 140C is so shaped as to be arcuately curved from the base portion 255 in the longitudinal direction of the body at right angles with respect to the hole 240C.

The connection of the down tube portion 22 and the connecting member 140c is effected, as shown in FIG. 16, such that the portion 252 projects rearwards of the body and such that the notched portions 254 of the connecting members 140C provided for the respective paired left and right down tube portions 22 are directed inwardly whereas the main portions 252 are directed outwardly. Since the curvature of the main portion 252 is the same as the diameter of the down tube portion 22, as indicated in broken lines in FIG. 16, the side shape is such that the front end of the link coupling 40C is hinged to the single continuous down tube portion 22, as shown in FIG. 15.

The connection of the down tube portion 22 and the connecting member 140C is effected, as shown in FIG. 16, such that the portion 252 projects rearwards of the body and such that the notched portions 254 of the connecting members 140C provided for the respective paired left and right down tube portions 22 are directed inwardly whereas the main portions 252 are directed outwardly. Since the curvature of the main portion 252 is the same as the diameter of the down tube portion 22, as indicated in broken lines in FIG. 16, the side shape is such that the front end of the link coupling 40C is hinged to the single continuous down tube portion 22, as shown in FIG. 15.

The tensile force of the chain 38 is exerted upon the link coupling 40C through the engine 25 and as a tensile load on the connecting portion between the link coupling 40C and the connecting member 140C. Since the connecting portion is made of the forged connecting member 140C having high strength and since the sectional top plan shape of the main portion 252 of the connecting member 140C is so curved as to protrude in the same longitudinal direction as that of the load, the connecting member 140c exhibits high strength and rigidity with respect to the tensile load, while achieving a reduction in weight by the notched portion 254, thereby effectively supporting the load.

As apparent from the description, the strength of the connecting portion of the link coupling can be made sufficiently high by its incorporating into the frame to resist tensile force of the chain, and it is possible to provide the strength and rigidity required by the support structure of this kind, in which the engine is coupled to and supported on the frame by the link coupling.

Figure 20:
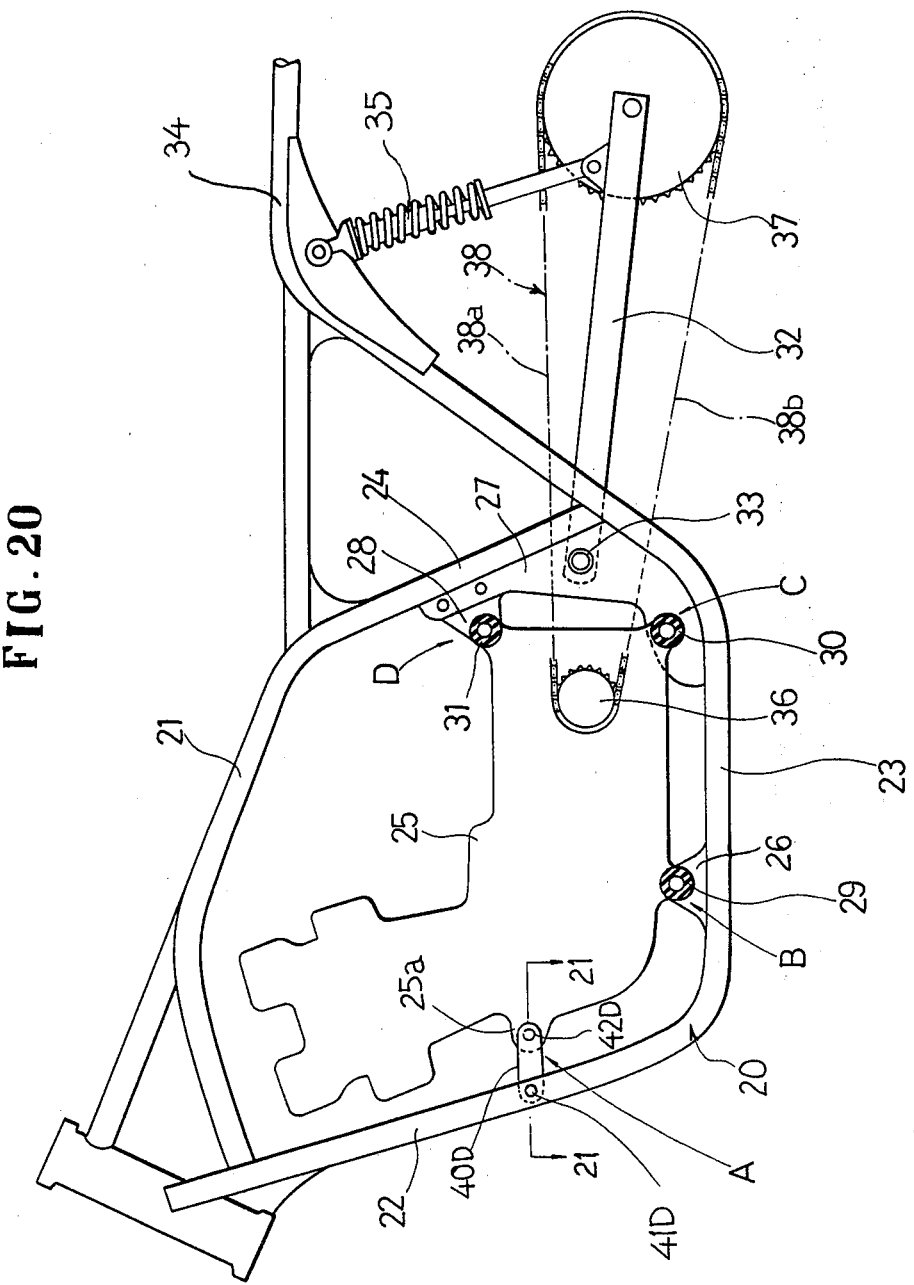
FIG. 20 is similar to FIG. 1 but shows another embodiment of the invention.
Figure 21:
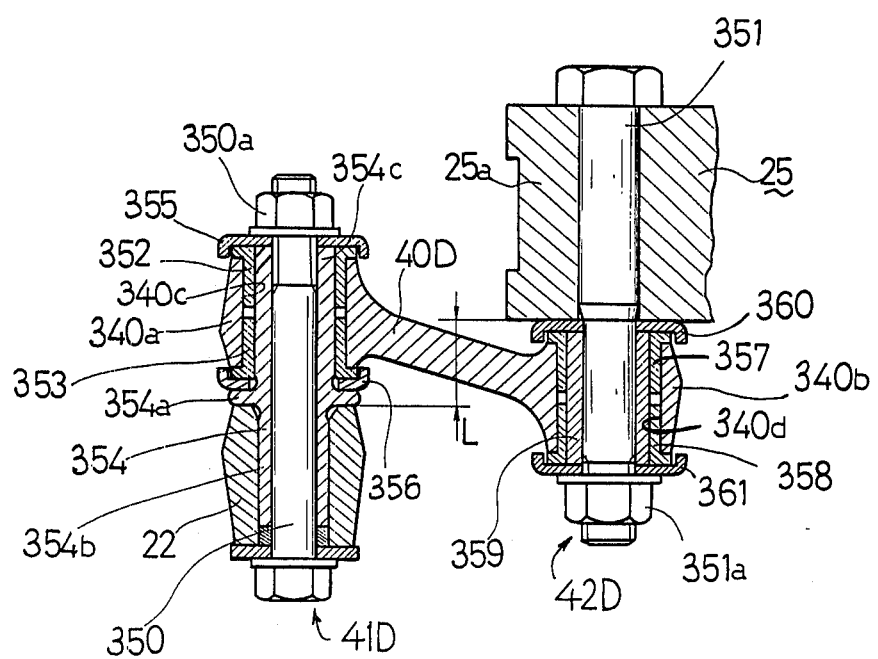
FIG. 21 is a sectional view taken on line 21—21 in FIG. 20.

FIG. 20 is similar to FIG. 1 and the same reference numerals have been used to denote the same elements. In FIG. 20 supports B,C,D are of the same construction as in FIG. 1. However, the support at A is composed of a modified link coupling 40D which is connected by pin 41D at its front end to down tube portion 22 and by pin 42D at its rear end to engine 25. The link coupling is capable of pivotal movement in a vertical plane by virtue of pins 41D and 42D. As seen in FIG. 21, pin 41D comprises a bolt 350 inserted into a boss portion which is formed in the down tube portion 22. Another boss portion 25a is formed at the front portion of the engine 25 and the pin 42D comprises a bolt 351 which extends into boss portion 25a. The bolts 350 and 351 are inserted into front and rear portions 340a and 340b of the link coupling 40D so that the link coupling is connected to the down tube portion 22 and the engine 25 upon securing nuts 350a and 351a on the bolts 350 and 351. The link coupling structure thus far described is symmetrically disposed in the widthwise direction of the body (i.e., in the vertical direction in FIG. 21), but only one coupling structure is shown in FIG. 21.

The front portion 340a of the link coupling 40D is formed with a hole 340c, in which bearing bushings 352 and 353 are press-fit from both the right and left sides thereof. A collar 354 formed with a flange portion 354a has a base portion 354b inserted into the down tube portion 22 and a leading portion 354c inserted into the bushings 352 and 353. The bolt 350 is inserted into the collar 354 while washers 355 and 356 are applied to the right and left end faces of the front portion 340a of the link coupling 40D and the nut 305a is tightened. The rear portion 340b of the link coupling 40D is formed with a hole 340d, in which bearing bushings 357 and 358 are press-fit from both the right and left sides thereof, and a collar 359 is inserted in bearing bushings 357 and 358. The bolt 351 is inserted in the collar 359, while washers 60 and 61 are applied against the right and left end faces of the rear portion 340b of the link coupling 40D and the nut 351a is tightened.

The vertical pivotal movement of the front and rear portions 340a and 340b of the link coupling 40D on the bolts 350 and 351 is effected such that the bushings 352, 357 and 358 are in sliding contact with the collars 354 and 359, and the bushings 352, 353, 357 and 358 serve as bearing members for the bolts 350 and 351 where the link coupling 40D is hinged to the down tube portion 22 and the engine 25. The bearing members may be bearings in place of the bushings.

As apparent from the description thus far, the bearing members, i.e., the bushings 352, 353, 357 and 358 are not arranged either at the down tube portion 22 or at the engine 25 but at the link coupling 40D. As a result, in either case the holes 340c and 340d into which the bushings 352,352,357 and 358 are press-fit are bored in the link coupling 40D or if the bushings 352,353,357 and 358 after press-fitting are to be reamed so that the collars 354 and 359 may be precisely inserted thereinto, it is sufficient that the machining operations required to minimize the size tolerance be performed at the link coupling 40D which is a small member. Therefore, the machining operations requiring precision need not be performed on the down tube portion 22 and on the engine 25 so that the machining operations can be facilitated.

In the present embodiment, the link coupling 40D is inclined in the widthwise direction of the body, as viewed in FIG. 21, so that the front and rear portions 340a and 340b of the link coupling 40D are offset in the widthwise direction of the body. In a motorcycle, in which the usable space having a length L in the widthwise direction of the body between the down tube portion 22 and the boss portion 25a of the engine 25 is restricted, the length between the coupling pins at the front and rear portions of the link coupling in the widthwise direction of the body is reduced, if the link extends straight in the longitudinal direction of the body, so that the contact area with the hinging pins is accordingly reduced. It is an advantage to provide widthwise offset of the front and rear portions 340a and 340b of the link coupling 40D by inclining the link coupling so that the length of the front and rear portions 340a and 340b in the widthwise direction of the body can be increased to enlarge the contact area of the front and rear portions 340a and 340b with the bolts 350 and 351 through the bushings 352, 353, 357 and 358 and through the collars 354 and 359, namely, the pressure receiving area whereby the coupling strength of the link coupling 40D can be improved.

FIG. 22 shows another embodiment, in which the link coupling 40D between body frame 20 and engine 25 is provided at support D instead of support A. In this embodiment, the support positions A, B and C use rubber mountings. The front and rear portions of the link coupling 40D are hingedly coupled to boss portion 125B at the rear portion of the engine 25 and to bracket 27 of rear frame portion 24 by means of horizontal pins 41D and 42D.

By virtue of the above construction, since the bearing members bearing the pins where the link coupling, the body frame and the engine are hingedly coupled are arranged neither at the body frame nor at the engine but at the link coupling, any machining operations for minimizing size tolerance can be performed at the link coupling. Moreover, since the link coupling is a small member, the machining operations can be facilitated. Moreover, since the link coupling is inclined in the widthwise direction of the body, the contact area of the link coupling with the hinge pins, the load bearing areas can be maximized, even though the usable space between the body frame and the engine in the widthwise direction of the body is small. Thereby, the coupling strength between the link coupling and the body frame and the engine can be augmented.

Although the invention has been described in relation to specific embodiments thereof, it will become apparent to those skilled in the art that numerous modifications and variations of the invention can be made within the scope and spirit of the invention as defined by the attached claims.

What is claimed is:

1. In a motorcycle of chain drive type comprising a frame, an engine, coupling means attaching the engine to the frame at a plurality of locations; a chain and a drive sprocket for driving a drive wheel of the motorcycle, said chain transmitting output power from the engine to the drive sprocket, the improvement wherein said coupling means includes at least at one of said plurality of locations, a link coupling coupled to said frame and engine for pivotal movement in a vertical plane, said frame including a down tube portion at the front thereof, said link coupling having a front end pivotably connected to said down tube portion and a rear end pivotably connected to said engine, said down tube portion including a pair of left and right tubes, said link coupling including a pair of substantially parallel link means associated with each of said tubes.

2. The improvement as claimed in claim 1 wherein each of said link means comprises a pair of link plates having spaced ends at said front end of the link coupling flanking the respective tube of the down tube portion and pivotably connected thereto.

3. The improvement as claimed in claim 1 wherein said drive sprocket is laterally offset at one side of said engine, said link coupling being rigid in the widthwise direction of the frame and also being laterally offset from said engine at the same side as said drive sprocket.

4. The improvement as claimed in claim 1 wherein said link means of said link coupling includes two link plates having spaced ends at said front end of the coupling flanking said down tube portion and pivotably connected thereto and abutting ends at said rear end of the coupling pivotably connected to said engine.

5. The improvement as claimed in claim 4 wherein said link coupling includes means providing metal-to-metal bearing contact at the pivotable connections between the link coupling and the down tube portion and the engine.

6. The improvement as claimed in claim 5 wherein said link coupling includes resilient thrust members between said link plates and said engine.

7. The improvement as claimed in claim 1 wherein said frame includes a rear frame portion at the rear thereof, said link coupling having a front end pivotably connected to said engine at the rear thereof and a rear end pivotably connected to said rear frame portion.

8. The improvement as claimed in claim 7 wherein said link coupling includes means providing metal-to-metal bearing contact at the pivotable connections between the link coupling and the rear frame portion and the engine.

9. The improvement as claimed in claim 7 wherein said engine has lateral sides, said link coupling including a link plate at each of the sides of the engine.

10. The improvement as claimed in claim 9 wherein said rear frame portion includes a pair of left and right tubes, each link plate pivotably connected to the engine and to the respective tube of the rear frame portion.

11. The improvement as claimed in claim 7 wherein said engine has lateral sides, said link coupling including a pair of link plates at each of the sides of the engine, one of said pair of link plates having first spaced ends flanking a boss on said engine at the associated side thereof and pivotably connected thereto and second abutting ends pivotably connected to the respective tube of the rear frame portion.

12. The improvement as claimed in claim 1 wherein said engine and said frame include respective bosses extending longitudinally towards one another, said link coupling being pivotably connected at opposite ends thereof to said bosses.

13. The improvement as claimed in claim 12 wherein said chain has upper and lower lengths, said link coupling being located at a level between said upper and lower lengths of said chain.

14. The improvement as claimed in claim 13 wherein said link coupling is disposed between the length of the chain between the engine at the rear thereof and said frame.

15. The improvement as claimed in claim 14 wherein said frame includes a rear frame portion with left and right tubes and a cross member joining said tubes, said boss on the frame being on said cross member.

16. The improvement as claimed in claim 1 wherein said link coupling includes a pair of vertically spaced link supports, each respectively pivotably connected to the engine at the rear thereof and to said frame.

17. The improvement as claimed in claim 16 wherein said chain has upper and lower lengths, said link supports being respectively located above and below the upper and lower lengths of the chain.

18. The improvement as claimed in claim 1 wherein said down tube portion including a link connecting portion having a hole therein, and a pivot pin in said hole and pivotably supporting said link coupling at one end thereof.

19. The improvement as claimed in claim 18 wherein said link connecting portion is a forged member.

20. The improvement as claimed in claim 19 wherein said forged member includes a curved portion which opens rearwardly and extends longitudinally along the down tube portion, and a tubular housing portion integrated with said curved portion and provided with said hole, said hole extending longitudinally of the frame and approximately perpendicular to the longitudinal axis of the down tube portion.

21. The improvement as claimed in claim 19 wherein said forged member has upper and lower end portions engaged with the remainder of said down tube portion.

22. The improvement as claimed in claim 21 wherein said upper and lower end portions are tubular.

23. The improvement as claimed in claim 1 comprising pins pivotably connecting the link coupling at opposite ends thereof respectively to the frame and the engine and bearing members on said pins.

24. The improvement as claimed in claim 23 wherein said bearing members at the frame and engine are laterally offset from one another such that said ends of the link coupling are transversely offset and said link coupling is inclined transversely.

25. The improvement as claimed in claim 24 comprising a collar on said pin connecting the link coupling to the frame, said frame being supported on said collar.

* * * * *